United States Patent [19]
Krebs et al.

[11] Patent Number: 5,271,017
[45] Date of Patent: Dec. 14, 1993

[54] COMMUNICATIONS PROTOCOL USING MICROSLOTS

[75] Inventors: Jay R. Krebs, Crystal Lake; Timothy J. Wilson, Schaumburg, both of Ill.

[73] Assignee: Motorola, Inc., Schaumburg, Ill.

[21] Appl. No.: 722,724

[22] Filed: Jun. 27, 1991

[51] Int. Cl.⁵ .............................................. H04J 3/16
[52] U.S. Cl. ..................................... 370/95.1; 370/99
[58] Field of Search ................. 30/95.1, 95.3, 50, 109, 30/80, 66, 85.2, 85.3; 455/32.1, 38.1, 39, 54.1, 56.1

[56] References Cited

U.S. PATENT DOCUMENTS

| | | | |
|---|---|---|---|
| 3,710,027 | 1/1973 | Herter et al. | 370/95.3 |
| 3,982,075 | 9/1976 | Jefferis et al. | 370/95.3 |
| 4,129,749 | 12/1978 | Goldman | 370/50 |
| 4,987,570 | 1/1991 | Almond et al. | 370/99 |

Primary Examiner—Douglas W. Olms
Assistant Examiner—Shick Hom
Attorney, Agent, or Firm—Wayne J. Egan

[57] ABSTRACT

An improved protocol for a radio communications system (100) having a base station (103), radio units (101), an inbound channel (107) for conveying information from the radio units to the base station, an outbound channel (105) for conveying information from the base station to the radio units, a first unit of time is defined as a microslot (201, 203, 205), and a second unit of time is defined as a slot (207), the slot comprising an integral number of consecutive and contiguous microslots. The base station sends timing information to the radio units, and indicates to the radio units when the inbound channel is idle by, first, determining when a microslot time period has expired (303) and, when this occurs, then determining when a slot time period has expired (305). If a slot has expired, the base station then determines whether the inbound channel is idle. If the inbound channel is idle (307), the base station then sends (311) a first symbol to the radio units on the outbound channel, but if the inbound channel is busy, the base station sends (309) a second symbol to the radio units on the outbound channel. Otherwise, if a slot has not expired, the base station sends (313) a third symbol to the radio units on the outbound channel. In a four-level frequency shift keying (FSK) system, for instance, the first (idle) and second (busy) symbol may use a $-3$ and $-3$ relative FSK frequency offsets, and the third symbol may use either a $+1$ or $-1$ relative FSK frequency offset.

10 Claims, 1 Drawing Sheet

COMMUNICATIONS PROTOCOL USING MICROSLOTS

TECHNICAL FIELD

This application relates to radio communications systems having a base station and one or more radio units, and an inbound channel and an outbound channel, and more particularly a method for the base station to send timing information to the radio units, and to indicate to the radio units when the inbound channel is idle.

BACKGROUND OF THE INVENTION

Digital radio communications systems have existed for some time. As is known, such systems transmit messages comprising groups of symbols, each group occupying a unit of time known as a slot. As is known, one problem experienced by radio units in such prior art systems is determining the busy/idle status of the inbound channel.

It is desirable to achieve a more flexible timing architecture.

SUMMARY OF THE INVENTION

As a result, an improved protocol using microslots is disclosed. Briefly, in a radio communications system having a base station and one or more radio units, and having an inbound channel for conveying information from the one or more radio units to the base station, and having an outbound channel for conveying information from the base station to the one or more radio units, a first unit of time is defined as a microslot, and a second unit of time is defined as a slot, the slot comprising an integral number of consecutive and contiguous microslots. In accordance with the invention, the base station sends timing information to the radio units, and indicates to the radio units when the inbound channel is idle by, first, determining when a microslot time period has expired and, when this occurs, then determining when a slot time period has expired. If a slot has expired, the base station then determines whether the inbound channel is idle. If the inbound channel is idle, the base station then sends a first symbol to the radio units on the outbound channel, but if the inbound channel is busy, the base station sends a second symbol to the radio units on the outbound channel. Otherwise, if a slot has not expired, the base station then sends a third symbol to the radio units on the outbound channel. In a four-level frequency shift keying (FSK) system, for instance, the first (idle) and second (busy) symbol may use a −3 and −3 relative FSK frequency offset, and the third symbol may use either a +1 or −1 relative FSK frequency offset.

DETAILED DESCRIPTION OF THE INVENTION

Figure 1:
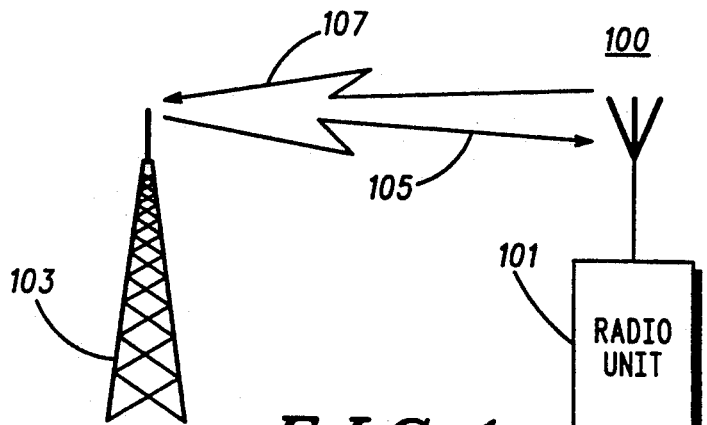
FIG. 1 is a block diagram showing a radio communication system using the improved protocol using microslots, according to the invention.

Referring now to FIG. 1, there is shown a radio communications system 100 comprising fixed equipment 103 and one or more radio units 101. There is also shown an outbound channel 105 that conveys information from the base station 103 to the radio unit 101, and an inbound channel 107 that conveys information from the radio unit 101 to the base station 103. The channels 105 and 107 may be, for instance, frequency modulation (FM) type, conveying multilevel symbols. For instance, in a four level system, four symbols may be defined by the relative frequency shift key (FSK) frequency offsets +3, +1, −1, and −3.

Figure 2:
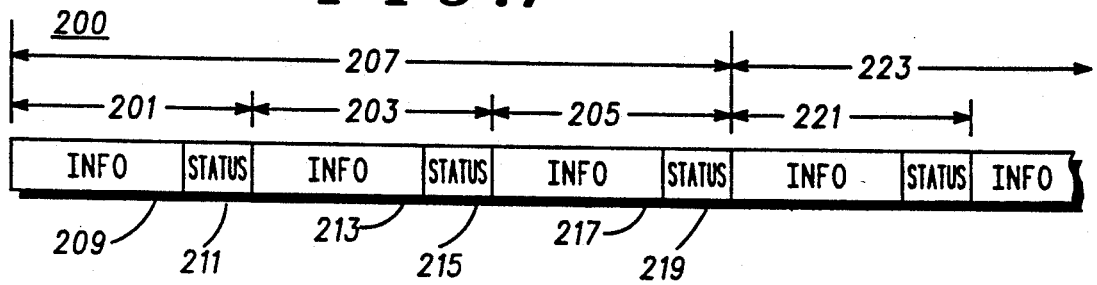
FIG. 2 is a diagram of a microslot structure in accordance with the invention.

Referring now to FIG. 2, there is shown a microslot structure 200 in accordance with the invention. There is shown a slot 207 comprising a plurality of microslots 201, 203, and 205. The first microslot 201 may contain, for instance, a frame synchronization sequence 209 containing 24 symbols. The second microslot 203 may contain, for instance, a station identifier sequence 213 containing 22 symbols. The third microslot 205 may contain, for instance, further information symbols 217 containing 22 symbols. While FIG. 2 depicts slot 207 as having three (3) microslots 201, 203, and 205, a slot may contain any number of microslots as appropriate to suit a particular application. The next or successive slot is depicted as 223. As shown, slot 223 has an initial microslot 221.

In FIG. 2 the individual microslot boundaries are defined by special symbols (known as status symbols) located as the last symbol of the microslot. Thus, status symbol 211 is the last symbol of microslot 201, and indicates the boundary between microslots 201 and 203. Likewise, status symbol 215 is the last symbol of microslot 203, and indicates the boundary between microslots 203 and 205. Likewise, status symbol 219 is the last symbol of microslot 205, and indicates the boundary between microslots 205 and 221.

In FIG. 2, the end of a slot (such as 207) is indicated when the last status symbol (such as 219) of the last microslot (such as 205) has a predetermined value, such as +3 or −3. The fixed equipment 103 selects the value (+3 or −3) depending on whether the inbound channel 107 is busy or idle. If the inbound channel 107 is busy, the status symbol is set to +3. If the inbound channel 107 is idle, the status symbol is set to +3.

In FIG. 2, the status symbols for all microslots other than the final microslot of the current slot are selected to avoid the values +3 or −3. Thus, they may be +1 or −1.

Therefore, a microslot (such as 201, 203, or 205) is the time duration, as measured from observing the outbound channel 105, from the beginning of a group of channel information symbols (such as 209, 213, or 217) and ending with a channel status symbol (such as 211, 215, or 219). The group of channel information symbols in FIG. 2 is either the 24 symbol group defining the frame synchronization pattern 209, or else groups of 22 symbols that repeat throughout the outbound frame. Microslots (such as 201, 203, or 205) are referenced to the frame sync pattern 209 in the outbound stream. Once the frame sync pattern is located, the radio unit 101 can identify all of the subsequent microslots within the message frame. When a frame ends, the radio 101 must search for the frame sync pattern again for reference.

Further, a slot (such as 207) is a time interval, measured from the outbound channel 105, consisting of an integer number of microslots (such as 201, 203, or 205) and is identified by sensing the value of the status symbol at the end of each microslot. The status symbol can take on three possible values: idle (−3), busy (+3), or unknown (−1 or +1).

If the value of the status symbol is either a busy (+3) or idle (−3) value, this denotes the end of the current slot (such as 207) and the beginning of the next slot (such as 223). In this case, the value of the status symbol 219, either idle (value=−3) or busy (value=+3), reports the inbound channel 107 status to be used for the next slot 223.

Otherwise, if the value of the status symbol is unknown (−1 or +1), then the end of a slot time (such as 207) has not been encountered.

Figure 3:
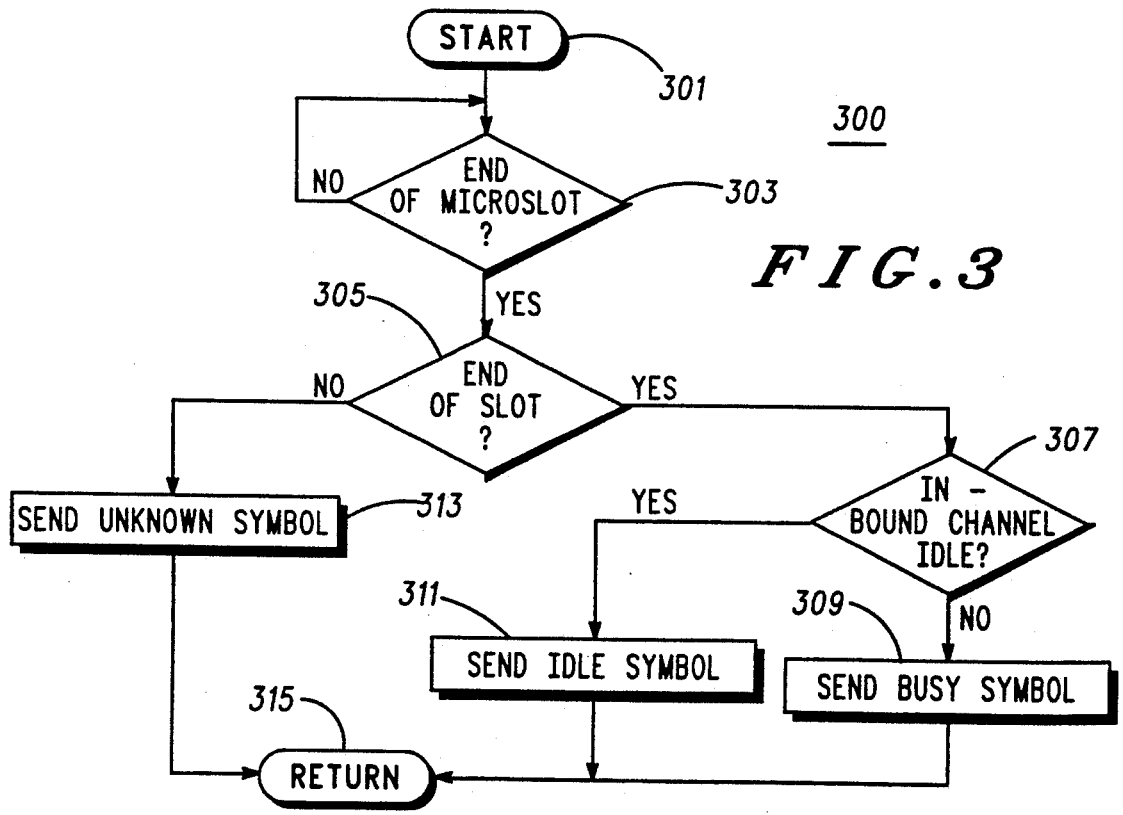
FIG. 3 is a flow diagram in accordance with the invention.

Referring now to FIG. 3, there is shown a flow diagram 300 for an improved protocol using microslots, according to the invention. The diagram depicts the steps followed by the base station 103.

The process starts at step 301, and then proceeds to step 303, where it determines whether a microslot time period has expired.

When a microslot time period has expired, the process goes to step 305, where it determines whether a slot has terminated, that is, whether the current microslot is the final microslot of the current slot. If the answer here (step 305) is negative, then the base station 103 transmits an unknown symbol on the outbound channel 105. This is step 313. In a four-level FSK system, for instance, the unknown symbol may have a relative FSK frequency offset of either +1 or −1. The process then returns (step 315) to start, step 301.

If the answer here (step 305) is positive, however, then the current slot (such as slot 207) has ended, and the upcoming or successive slot (such as slot 223) is about to begin. As a result, the base station next determines whether the inbound channel 107 is idle for the upcoming slot, step 307. If the answer here (step 307) is affirmative, then the base station 103 sends an idle symbol on the outbound channel 105. This is step 311. In a four-level FSK system, for instance, the idle symbol may have a value of −3. The process then returns (step 315) to start, step 301.

Otherwise, if the inbound channel 107 is busy, then the determination from step 307 is negative. In this case, the base station 103 sends a busy symbol on the outbound channel 105. This is step 309. In a four-level FSK system, for instance, the busy symbol may have a value of +3. The process then returns (step 315) to start, step 301.

Those skilled in the art will appreciate that the present invention would be equally applicable in any communications system using at least three (3) symbols, one each for the idle, busy, and unknown states. The embodiment depicted in FIG. 2 uses four (4) symbols, and thus the unknown symbol is selected from a group having 2 members, namely +1 and −1. On the other hand, the number of symbols may be greater than 4, and thus the possible values for the unknown symbol would be greater than 2.

Further, although the embodiment depicted uses multi-level frequency shift keying (FSK), other embodiments are possible. Also, the microslots may be modified to comprise either a fixed number or varying number of symbols.

As used herein, the terms "slot" and "slot time period" are used as equivalents. Likewise, the terms "microslot" and "microslot time period" are used interchangeably herein.

While various embodiments of an improved protocol using microslots, according to the present invention, have been described hereinabove, the scope of the invention is defined by the following claims.

What is claimed is:

1. In a radio communications system having a base station and at least one radio unit and having an inbound channel for conveying information from said at least one radio unit to the base station, the radio communications system having an outbound channel for conveying information from the base station to said at least one radio unit, the radio communications system having a plurality of predefined symbols, the plurality of predefined symbols including a first symbol, a second symbol, and a third symbol, and wherein a first unit of time is defined as a microslot, and a second unit of time is defined as a slot, the slot comprising an integral number of microslots, a method for the base station to send timing information to the at least one radio unit and to indicate to the at least one radio unit when the inbound channel is idle, the method comprising the following steps:

at the base station:

(a) determining when a microslot has expired;

(b) when a microslot has expired, then determining when a slot has expired;

(c) when a slot has expired, then determining whether the inbound channel is idle;

(d) when the inbound channel is idle, then sending the first symbol to the at least one radio unit on the outbound channel;

(e) when the inbound channel is busy, then sending the second symbol to the at least one radio unit on the outbound channel;

(f) when a slot has not expired, then sending the third symbol to the at least one radio unit on the outbound channel.

2. The method of claim 1 where the third symbol is selected from a group having a plurality of symbols.

3. The method of claim 2 where the first, second, and third symbols are multi-level frequency shift keying symbols.

4. The method of claim 3 where each microslot comprises a fixed number of multi-level frequency shift keying symbols.

5. The method of claim 4 where the multi-level frequency shift keying symbols have four levels, with relative frequency shift keying frequency offsets of +3, +1, −1, and −3.

6. The method of claim 5 where the third symbol is selected from the group of symbols having relative frequency shift keying frequency offsets of +1 and −1.

7. The method of claim 1, where each slot includes a first microslot, the first microslot containing one or more symbols which convey frame synchronization information.

8. The method of claim 7, where each slot includes a second microslot, the second microslot containing one or more symbols which convey station identifier information.

9. The method of claim 8 where the first symbol and second symbol have relative frequency shift keying frequency offsets of −3 and +3, respectively.

10. The method of claim 8 where the first symbol and second symbol have relative frequency shift keying frequency offsets of +3 and −3, respectively.

* * * * *